United States Patent [19]

Meidan

[11] Patent Number: 5,276,907
[45] Date of Patent: Jan. 4, 1994

[54] METHOD AND APPARATUS FOR DYNAMIC DISTRIBUTION OF A COMMUNICATION CHANNEL LOAD IN A CELLULAR RADIO COMMUNICATION SYSTEM

[75] Inventor: Reuven Meidan, Ramat Hasharon, Israel

[73] Assignee: Motorola Inc., Schaumburg, Ill.

[21] Appl. No.: 637,858

[22] Filed: Jan. 7, 1991

[51] Int. Cl.⁵ .............................................. H04Q 7/04
[52] U.S. Cl. ................................ 455/33.3; 455/56.1; 379/60
[58] Field of Search ....................... 455/33, 34, 54, 56; 379/59, 60, 63

[56] References Cited

U.S. PATENT DOCUMENTS

| | | | |
|---|---|---|---|
| 4,249,181 | 2/1981 | Lee | 455/33.3 |
| 4,435,840 | 3/1984 | Kojima | 455/56 |
| 4,751,725 | 6/1988 | Bonta et al. | 455/33.3 |

Primary Examiner—Reinhard J. Eisenzopf
Assistant Examiner—Philip J. Sobutka
Attorney, Agent, or Firm—Shawn B. Dempster

[57] ABSTRACT

A method and apparatus is provided for dynamic distribution of a communication channel load in a sectorized cellular radio communication system. The channel load is distributed by narrowing a first sector antenna beamwidth of an overloaded sector of a cell site and widening a second sector antenna beamwidth of an adjacent sector of the cell site and subsequently handing off subscriber units previously in the first sector antenna beamwidth. Alternatively, channel load is distributed by reducing power of a sector or omni-directional antenna which is adjacent to an overloaded antenna, if the channel from an overloaded antenna to an antenna of a subscriber unit is overloaded due to interference. Subsequent to the occurrence of the channel interference condition, subscriber units are handed off to the particular antenna which is best able to service the subscriber units.

12 Claims, 1 Drawing Sheet

METHOD AND APPARATUS FOR DYNAMIC DISTRIBUTION OF A COMMUNICATION CHANNEL LOAD IN A CELLULAR RADIO COMMUNICATION SYSTEM

FIELD OF THE INVENTION

The present invention relates to communication systems which employ spread-spectrum signals and, more particularly, to a method and apparatus for dynamically distributing communication channel load in a cellular radio communication system.

BACKGROUND OF THE INVENTION

In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

Two types of two-way communication channels exist, namely, point-to point channels and point-to-multipoint channels. Examples of point-to-point channels include wirelines (e.g., local telephone transmission), microwave links, and optical fibers. In contrast, point-to-multipoint channels provide a capability where many receiving stations may be reached simultaneously from a single transmitter (e.g. cellular radio telephone communication systems). These point-to-multipoint systems are also termed Multiple Address Systems (MAS).

In any communication system, there are two primary communication resources to be employed, namely, average transmitted power and channel bandwidth. The average transmitted power is the average power of the transmitted signal. The channel bandwidth defines the range of frequencies that the channel can handle for the transmission of signals with satisfactory fidelity. A general system design objective is to use these two resources as efficiently as possible. In most channels, one resource may be considered more important than the other. Hence, we may also classify communication channels as power-limited or band-limited. For example, the telephone circuit is a typical band-limited channel, whereas a deep-space communication link or a satellite channel is typically power-limited.

The transmitted power is important because, for a receiver of prescribed noise figure, it determines the allowable separation between the transmitter and receiver. In other words, for a receiver of prescribed noise figure and a prescribed distance between it and the transmitter, the available transmitted power determines the signal-to-noise ratio at the receiver input. This, subsequently, determines the noise performance of the receiver. Unless performance exceeds a certain design level, the transmission of message signals over the channel is not considered to be satisfactory.

Additionally, channel bandwidth is important because, for a prescribed band of frequencies characterizing a message signal, the channel bandwidth determines the number of such message signals that can be multiplexed over the channel. In other words, for a prescribed number of independent message signals that have to share a common channel, the channel bandwidth determines the band of frequencies that may be allotted to the transmission of each message signal without discernible distortion.

Analog and digital transmission methods are used to transmit a message signal over a communication channel. The use of digital methods offers several operational advantages over analog methods, including but not limited to: increased immunity to channel noise and interference, flexible operation of the system, common format for the transmission of different kinds of message signals, improved security of communication through the use of encryption, and increased capacity.

These advantages are attained at the cost of increased system complexity. However, through the use of very large-scale integration (VLSI) technology, a cost-effective way of building the hardware has been developed.

One digital transmission method that may be used for the transmission of message signals over a communication channel is pulse-code modulation (PCM). In PCM, the message signal is sampled, quantized, and then encoded. The sampling operation permits representation of the message signal by a sequence of samples taken at uniformly-spaced instants of time. Quantization trims the amplitude of each sample to the nearest value selected from a finite set of representation levels. The combination of sampling and quantization permits the use of a code (e.g., binary code) for the transmission of a message signal. Other forms of digital transmission use similar methods to transmit message signals over a communication channel.

When message signals are digitally transmitted over a band-limited channel, a form of interference known as intersymbol interference may result. The effect of intersymbol interference, if left uncontrolled, is to severely limit the rate at which digital data may be transmitted without error over the channel. The cure for controlling the effects of intersymbol interference may be controlled by carefully shaping the transmitted pulse representing a binary symbol 1 or 0.

Further, to transmit a message signal (either analog or digital) over a band-pass communication channel, the message signal must be manipulated into a form suitable for efficient transmission over the channel. Modification of the message signal is achieved by means of a process termed modulation. This process involves varying some parameter of a carrier wave in accordance with the message signal in such a way that the spectrum of the modulated wave matches the assigned channel bandwidth. Correspondingly, the receiver is required to recreate the original message signal from a degraded version of the transmitted signal after propagation through the channel. The re-creation is accomplished by using a process known as demodulation, which is the inverse of the modulation process used in the transmitter.

In addition to providing efficient transmission, there are other reasons for performing modulation. In particular, the use of modulation permits multiplexing, that is, the simultaneous transmission of signals from several message sources over a common channel. Also, modulation may be used to convert the message signal into a form less susceptible to noise and interference.

For multiplexed communication systems, the system typically consists of many remote units (i.e. subscriber units) which require active service over a communication channel for short or discrete intervals of time rather than continuous service on a communication channel at all times. Therefore, communication systems have been designed to incorporate the characteristic of communicating with many remote units for brief intervals of time on the same communication channel. These systems are termed multiple access communication systems.

One type of multiple access communication system is a frequency division multiple access (FDMA) system. In an FDMA system, the communication channel is divided into several narrow frequency bands. Individuals communication channel links are established between two communication units within one of these narrow frequency bands. These communication links are maintained for discrete amounts of time while the two communication units transmit and receive signals. During particular communication links between the two communication units, the communication system does not allow other communication units access to the narrow frequency band within the communication channel which is being utilized by the communication units in the particular communication link.

Another type of multiple access communication system is a time division multiple access (TDMA) system. In a TDMA system, the communication channel is divided into time slices of a time frame to allow communication links between two communication units to exist in the same communication channel simultaneously, but at different time slices. This is accomplished by assigning particular time slices of a time frame to a particular communication link and other time slices to other communication links. During these particular communication links between the two communication units, the communication system does not allow other communication units access to the time slice of the time frame within the communication channel which is being utilized by the communication units in the particular communication link.

Further, another type of multiple access communication system is a spread spectrum system. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Unlike FDMA and TDMA systems, in spread spectrum systems a signal may be transmitted in a channel in which the noise power is higher than the signal power. The modulation and demodulation of the message signal using spread spread spectrum techniques provides a signal-to-noise gain which enables the recovery of the message signal from a noisy communication channel. The greater the signal-to-noise ratio for a given system equates to: (1) the smaller the bandwidth required to transmit a message signal with a low rate of error or (2) the lower the average transmitted power required to transmit a message signal with a low rate of error over a given bandwidth.

Three general types of spread spectrum communication techniques exist, including:

The modulation of a carrier by a digital code sequence whose bit rate is much higher than the information signal bandwidth. Such systems are referred to as "direct sequence" modulated systems.

Carrier frequency shifting in discrete increments in a pattern dictated by a code sequence. These systems are called "frequency hoppers". The transmitter jumps from frequency to frequency within some predetermined set; the order of frequency usage is determined by a code sequence. Similarly "time hopping" and "time-frequency hopping" have times of transmission which are regulated by a code sequence.

Pulse-FM or "chirp" modulation in which a carrier is swept over a wide band during a given pulse interval.

Information (i.e. the message signal) can be embedded in the spectrum signal by several methods. One method is to add the information to the spreading code before it is used for spreading modulation. This technique can be used in direct sequence and frequency hopping systems. It will be noted that the information being sent must be in a digital form prior to adding it to the spreading code because the combination of the spreading code, typically a binary code, involves module-2 addition. Alternatively, the information or message signal may be used to modulate a carrier before spreading it.

Thus, a spread spectrum system must have two properties: (1) the transmitted bandwidth should be much greater than the bandwidth or rate of the information being sent and (2) some function other than the information being sent is employed to determine the resulting modulated channel bandwidth.

The essence of the spread spectrum communication involves the art of expanding the bandwidth of a signal, transmitting the expanded signal and recovering the desired signal by remapping the received spread spectrum into the original information bandwidth. Furthermore, in the process of carrying out this series of bandwidth trades, the purpose of spread spectrum techniques is to allow the system to deliver error-free information in a noisy signal environment.

Spread spectrum communication systems can be multiple access systems like FDMA and TDMA communication systems. One type of multiple access spread spectrum system is a code division multiple access (CDMA) system. In a CDMA system, communication between two communication units is accomplished by spreading each transmitted signal over the frequency band of the communication channel with a unique user spreading code. As a result, transmitted signals are in the same frequency band of the communication channel and are separated only by unique user spreading codes. Particular transmitted signals are retrieved from the communication channel by despreading a signal representative of the sum of signals in the communication channel with a user spreading code related to the particular transmitted signal which is to be retrieved from the communication channel. A CDMA system may use direct sequence or frequency-hopping spreading techniques.

Each of these multiple access systems (i.e. FDMA, TDMA, and CDMA) can be utilized in cellular radio communication systems. In cellular radio communication systems, factors which limit the performance of system are distortion and noise. Typically, in propagating through a communication channel, a transmitted signal is distorted because of nonlinearities and imperfections in the frequency response of the communication channel. Other sources of degradation are noise and interference picked up by the signal during the course of transmission through the communication channel.

There are various sources of noise in a CDMA spread spectrum communication system. The sources of noise may be internal as well as external to the communication system. In CDMA, the majority of noise in the communication channel is from signals which are being transmitted with unique user spreading codes. These spread signals contribute to the overall noise in the communication channel.

To limit the noise in cellular communication systems as well as increase the capacity of the cellular communication systems, reuse the available but limited number of communication resources. To ensure the re-use of communication resources does not cause unacceptable noise in the communication channel, cell sites, which are allocated the same communication resources, are geographically separated. By having sufficient geographic separation, the noise in the communication channel is limited. However, the geographic separation needed to ensure an adequate signal-to-noise ratio (negligible noise in the communication channel) limits the capacity of the communication system because not all of the available communication resources may be used in each cell site.

To enhance the efficiency of communication resource re-use and to improve capacity of the cellular system, the cell sites can be divided into sectors, wherein each sector contains a percentage of the available communication resources. By having the cell sites divided into sectors, the required geographic separation may be reduced while maintaining an adequate signal-to-noise ratio. For example, U.S. Pat. No. 4,128,740, assigned to Motorola, Inc., discloses a four cell-six sector communication resource re-use pattern. As disclosed, each cell site is divided into six sectors and each sector contains approximately 1/24 of the available communication resources. For every four cell sites, the communication resource pattern is repeated. This communication resource re-use pattern may be further reduced to a one cell site re-use pattern as disclosed in pending U.S. application Ser. No. 07/459,624 which was filed Jan. 2, 1990 and is also assigned to Motorola Inc.

However, in a CDMA spread spectrum communication system, most of the noise in the communication channel in a particular cell site is from signals which are being transmitted with unique user spreading codes within that particular cell site. Thus, a one cell site reuse pattern is possible if the noise from cell sites surrounding the particular cell site is ignored. The total number of communication links that a particular cell site can simultaneously handle is related to the noise in the communication channel which is from sources external to the system. The use of this one site reuse pattern will limit the capacity of the communication system in this particular cell site to handle communication links, since noise from adjacent cell sites will be considered a part of the external noise for the particular cell site.

The present invention enhances the capability of spread-spectrum systems and, in particular, CDMA cellular radio-telephone systems to handle unequal channel loading of cells. In CDMA cellular radio-telephone systems, the "users" are in the same frequency band and separated only by unique spreading codes. The number of users that can use the same frequency band is limited by the noise interference level. The noise interference level is directly related to the interference level created by the users actively using the frequency band and nearby cell sites operating in the same frequency band. The present invention dynamically changes the noise level present in a frequency band and the communication channel load of individual cell sites to increase the capacity of the communication system.

SUMMARY OF THE INVENTION

A method and apparatus is provided for dynamic distribution of a communication channel load in a sectorized cellular radio communication system having sector antennae, each sector antenna having a beamwidth and a beamlength. The channel load is distributed by narrowing a first sector antenna beamwidth of an overloaded sector of a cell site and widening a second sector antenna beamwidth of an adjacent sector of the cell site and subsequently handing off subscriber units previously in the first sector antenna beamwidth.

An alternative method apparatus is provided for dynamic distribution of communication load in a radio communication system. The channel load is distributed by reducing power of an antenna which is adjacent to an overloaded antenna, if the channel from an antenna of the overloaded cell site to an antenna of a subscriber unit is overloaded due to interference. Subsequent to the occurence of the channel interference condition, the subscriber units in the overloaded cell site are handed off to the particular cell site which is best able to service the subscriber units. This alternative method and apparatus can be applied to sectorized cell sites or cell sites having omni-directional antennae.

DETAILED DESCRIPTION

Typically in cellular radio communication systems, the coverage area of the communication systems is assumed to have equal distribution of channel load throughout the system. However, in reality, most subscriber units are not equally distributed throughout the cellular radio communication system and as such the channel load is not equally distributed. For example, cars having subscriber units are on freeways during rush hours. Because freeways are located in limited portions of the cell sites in a radio communication system, the location of subscriber units which desire service from cell sites during a particular period of time is limited to particular cell sites having freeways within their boundaries. As a result, unequal cell site channel loading occurs. Or more particularly, one or more cell sites are more heavily loaded than surrounding cell sites.

In the preferred embodiment, CDMA spread spectrum communication systems having one cell frequency reuse patterns are used. However, the present invention may be used by other types of communication systems other than the preferred embodiment without departing from the teachings of the present invention disclosure. In a spread spectrum system, because the system is interference limited, the capacity of a particular cell site is related in part to the amount of interference being contributed to the particular cell site from surrounding cell sites and subscriber units in the particular cell site. It is desirable to dynamically distribute the communication channel load among the cell sites such that some of the channel load from overloaded cell sites is assigned to the neighboring cell sites. This can be accomplished through the use of a number of different techniques.

Figure 1:
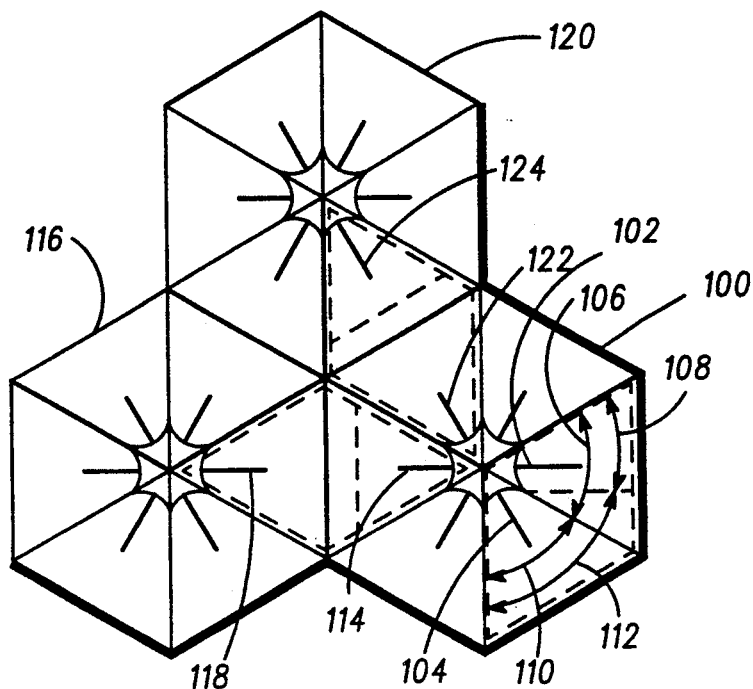
FIG. 1 is a diagram showing a preferred embodiment set of sectorized cells of a radio communication system.

In one preferred embodiment, shown in FIG. 1, a beamwidth pattern 106 of an antenna 102 of an overloaded spread spectrum cell sector is narrowed to a reduced beamwidth pattern 108. In conjunction with this narrowing of an antenna beamwidth pattern, a beamwidth pattern 110 of an antenna 104 of an adjacent cell sector is widened to an increased beamwidth pattern 112. Subscriber units which were in the beamwidth patterns of antennae 102 and 104 will be handed off automatically to the antenna best able to provide a communication channel to the individual subscriber unit. This handing off of subscriber units can be done by mechanisms already known in the art or any other suitable communication link handoff mechanism.

Handoff can be defined as the process of transferring a transmission in progress between one cell site and a subscriber unit to another cell site in coordination with both cell sites and the subscriber unit. Present radio communication systems require that the system continuously monitor the quality of every transmission in the communication channel. The system recognizes when the quality of a transmission in the channel falls below a predetermined threshold in a particular cell site and determines if other cell sites can satisfactorily handle the transmission. Once a more suitable cell site is identified, the system sends instructions to the subscriber unit directing it to use another communication channel for the current transmission. The subscriber unit confirms that it is leaving its current channel, switches to the new channel, synchronizes to the new channel and begins transmitting in the new channel.

The effect of this narrowing and widening of antenna beamwidth patterns is to transfer communication channel load from the overloaded cell sector to an adjacent cell sector which is able to handle an increased communication channel load.

In an alternative embodiment, a sector of cell 100 is overloaded by interference in the communication channel link from an antenna 122 of the overloaded cell sector to an antenna of a subscriber unit. This interference in the communication channel link comes from cell sites operating in the same frequency band as the overloaded sector cell as well as other sources. The overloaded sector cell initiates a request to an adjacent sector of an adjacent cell 120 to reduce its power at the antenna 124 servicing the adjacent cell sector. Alternatively, other sectors of cell 100 can be considered adjacent sectors and as such may reduce their power as a result of a request by the overloaded sector cell. This reduction in the antenna 124 power effectively reduces the full capacity geographic boundaries of the sector serviced by the antenna 124 in conventional radio communication systems (e.g. two-way trunking, ultra high frequency (UHF), very high frequency (VHF) radio communication systems). However, spread spectrum communication systems are not power limited, but rather are interference limited. Thus, the reduction of power at antenna 124 will not necessarily reduce the geographic boundaries or channel capacity of the cell sector serviced by antenna 124. If this reduced antenna power cell sector is not operating near full capacity, then the antenna 124 and associated receiver can still recover transmissions between antennae of subscriber units and the antenna 124 of the reduced power cell sector which are in the communication channel at a reduced power. However, this reduction in power of antenna 124 will reduce the interference in the communication channel link between an antenna of a subscriber unit to antenna 122 of the overloaded sector of cell 100. Thus, the communication channel capacity of the overloaded sector of cell 100 is increased. Also, subscriber units which were transmitting through the communication channel to antennae 122 and 124 will be handed off automatically to the antenna best able to provide a communication channel to the individual subscriber unit after this reduction in power at antenna 124. This handing off of subscriber units can be done by mechanisms already known in the art and briefly described above or any other suitable communication link handoff mechanism.

Figure 2:
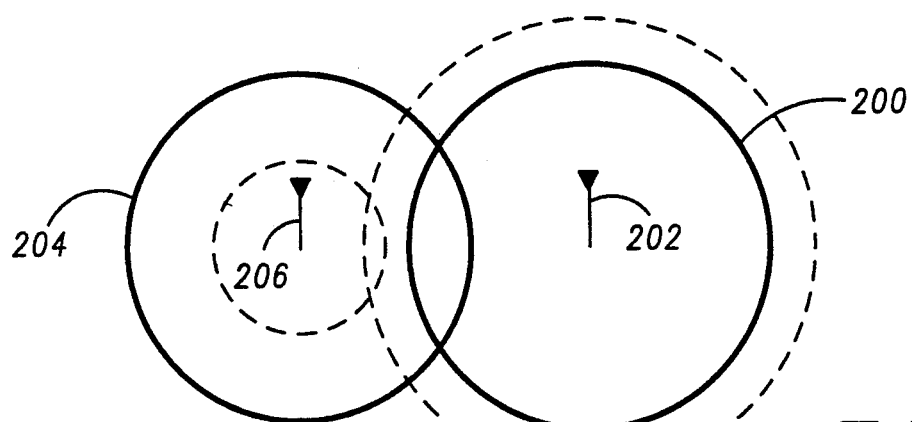
FIG. 2 is a diagram showing an alternative preferred embodiment of cells of a radio communication system.

This same technique of power reduction can be utilized by cells which do not have sectorized regions serviced by sectorized antenna. FIG. 2 show a diagram of such an alternative preferred embodiment of cells of a radio communication system. In this alternative embodiment, a cell 200 is overloaded by interference in the communication channel link from an antenna 202 of the overloaded cell 200 to an antenna of a subscriber unit. This interference in the communication channel link comes from cell sites operating in the same frequency band as the overloaded cell site as well as other sources. The overloaded cell 200 initiates a request to an adjacent cell 204 to reduce its power at the antenna 206 servicing the adjacent cell 204. This reduction in the antenna 206 power effectively reduces the full capacity geographic boundaries of the cell 204 serviced by the antenna 206 in traditional radio communication systems. However, as previously described, spread spectrum communication systems are not power limited, but rather are interference limited. Thus, the reduction of power at antenna 206 will not necessarily reduce the geographic boundaries or channel capacity of the cell 204 serviced by antenna 206. If this reduced antenna power cell 204 is not operating near full capacity, then the antenna 206 and associated receiver can still recover transmissions between antennae of subscriber units and the antenna 206 of the reduced power cell 204 which are in the communication channel at a reduced power. However, this reduction in power of antenna 204 will reduce the interference in the communication channel link between an antenna of a subscriber unit to antenna 202 of the overloaded cell 200. Thus, the communication channel capacity of the overloaded cell 200 is increased. Also, subscriber units which were transmitting through the communication channel to antennae 202 and 206 will be handed off automatically to the antenna best able to provide a communication channel to the individual subscriber unit after this reduction in power at antenna 206. This handing off of subscriber units can be done by mechanisms already known in the art and briefly described above or any other suitable communication link handoff mechanism.

Similarly in an alternative embodiment, a sector of cell 100 is overloaded by interference in the communication channel link from an antenna of a subscriber unit to an antenna 114 of the overloaded cell sector. This interference in the communication channel link comes from subscriber units in the overloaded sector cell which are operating in the same frequency band as the overloaded sector cell as well as other sources. The overloaded sector cell initiates a request to an adjacent sector of an adjacent cell 116 to increase its power at the antenna 118 servicing the adjacent cell sector. Alternatively, other sectors of cell 100 can be considered adjacent sectors and as such may increase their power as a result of a request by the overloaded sector cell. The increase in power of antenna 118 in the adjacent sector will cause the subscriber units being serviced by the antenna 118 to determine that the communication channel link has improved with the antenna 118 since the signals being received from the increased power antenna 118 have improved due to their increased power. As a result of this perceived improvement in the communication channel link, the subscriber units in the adjacent sector cell will reduce their respective transmit power to the antenna 118. This reduction in transmit power of the subscriber units in the adjacent sector cell will reduce the interference at the antenna 114. In addition, this increase in the antenna 118 power effectively increases the full capacity geographic boundaries of the sector serviced by the antenna 118. The increase of power at antenna 118 actually will reduce the geographic boundaries or channel capacity of the cell sector serviced by antenna 114. This increased power of antenna 118 will allow the cell sector serviced by this increased power antenna 118 to recover transmissions in the communication channel which were formerly serviced by antenna 114, thereby effectively reducing the service area for antenna 114 and relieving channel load capacity of the overloaded sector of cell 100. The subscriber units which were transmitting through the communication channel to antennae 114 and 118 will be handed off automatically to the antenna best able to provide a communication channel to the individual subscriber unit after this increase in power at antenna 118. This handing off of subscriber units can be done by mechanisms already known in the art and briefly described above or any other suitable communication link handoff mechanism.

Figure 3:
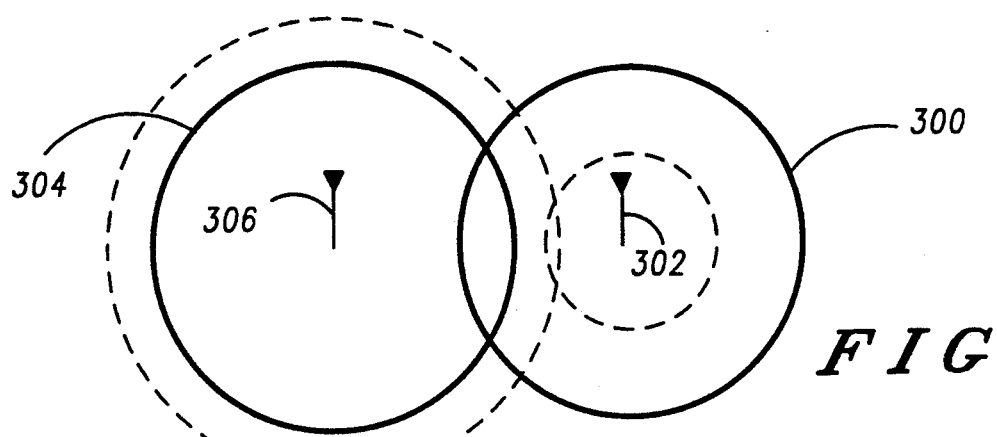
FIG. 3 is a diagram showing an alternative preferred embodiment of cells of a radio communication system.

This same technique of power reduction can be utilized by cells which do not have sectorized regions serviced by sectorized antenna. FIG. 3 show a diagram of such an alternative preferred embodiment of cells of a radio communication system. In this alternative embodiment, a cell 300 is overloaded by interference in the communication channel link from an antenna of a subscriber unit to an antenna 302 of the overloaded cell 300. This interference in the communication channel link comes from subscriber units in the overloaded cell site which are operating in the same frequency band as the overloaded cell site as well as other sources. The overloaded cell 300 initiates a request to an adjacent cell 304 to increase its power at the antenna 306 servicing the adjacent cell 304. The increase in power of antenna 306 in the adjacent cell 304 will cause the subscriber units being serviced by the antenna 306 to determine that the communication channel link has improved with the antenna 306, since the signals being received from the increased power antenna 306 have improved due to their increased power. As a result of this perceived improvement in the communication channel link, the subscriber units in the adjacent cell 304 will reduce their respective transmit power to the antenna 306. This reduction in transmit power of the subscriber units in the adjacent cell 304 will reduce the interference at the antenna 302. In addition, this increase in the antenna 306 effectively increases the geographic boundaries of the cell 304 serviced by the antenna 306. The increase of power at antenna 306 actually will reduce the geographic boundaries or channel capacity of the cell 300 serviced by antenna 302. This increased power of antenna 306 will allow the cell 304 service by this increased power antenna 306 to recover transmissions in the communication channel which were formerly serviced by antenna 302, thereby effectively reducing the service area for antenna 302 and relieving channel load capacity of the overloaded cell 300. The subscriber units which were transmitting through the communication channel to antennae 302 and 306 will be handed off automatically to the antenna best able to provide a communication channel to the individual subscriber unit after this increase in power at antenna 306. This handing off of subscriber units can be done by mechanisms already known in the art and briefly described above or any other suitable communication link handoff mechanism.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A method of dynamic distribution of communication channel load in a sectorized cellular radio communication system having sector antennae, each sector antenna having a beamwidth and a beamlength, comprising:
    (a) narrowing a first sector antenna beamwidth of an overloaded sector of a cell of the radio communication system;
    (b) widening a second sector antenna beamwidth of an adjacent sector of the cell of the radio communication system; and
    (c) automatically handing off subscriber units which were previously in the first sector antenna beamwidth.

2. The method of claim 1 wherein the radio communication system comprises a spread-spectrum radio communication system.

3. A method of dynamic distribution of communication channel load in a radio communication system, comprising:
    (a) reducing power of an antenna of the radio communication system which is adjacent to an overloaded antenna of the radio communication system, if the overloaded antenna is overloaded due to interference in a communication channel of the radio communication system from the overloaded antenna to an antenna of a subscriber unit; and (b) automatically handling off subscriber units between the overloaded and adjacent antennae.

4. The method of claim 3 wherein:
(a) the radio communication system comprises a sectorized cell;
(b) the overloaded antenna comprises a sector antenna of the sectorized cell; and
(c) the step of reducing the antenna power of the adjacent antenna comprises reducing the power of a sector antenna of the sectorized cell which is adjacent to the overloaded sector antenna.

5. The method of claim 3 wherein:
(a) the radio communication system comprises a first and a second cell;
(b) the overloaded antenna comprises an antenna in the first cell; and
(c) the step of reducing the antenna power of the adjacent antenna comprises reducing the power of an antenna of the second cell which is adjacent to the overloaded antenna.

6. The method of claim 3 wherein the radio communication system comprises a spread-spectrum radio communication system.

7. A sectorized cellular radio communication system having dynamic distribution of communication channel load, the radio communication system having sector antennae, each sector antenna having a beamwidth and a beamlength, comprising:
(a) beamwidth control means for:
 (i) narrowing a first sector antenna beamwidth of an overloaded sector of a cell of the radio communication system; and
 (ii) widening a second sector antenna beamwidth of an adjacent sector of the cell of the radio communication system; and
(b) handoff means for automatically handing off subscriber units which were previously in the first sector antenna beamwidth.

8. The radio communication system of claim 7 wherein the radio communication system comprises a spread-spectrum radio communication system.

9. A radio communication system having dynamic distribution of communication channel load, comprising:
(a) power control means for reducing power of an antenna of the radio communication system which is adjacent to an overloaded antenna of the radio communication system when the overloaded antenna is overloaded due to interference in a communication channel of the radio communication system from the overloaded antenna to an antenna of a subscriber unit; and
(b) handoff means for automatically handing off subscriber units between the overloaded and adjacent antennae.

10. The radio communication system of claim 9 wherein:
(a) the radio communication system comprises a sectorized cell:
(b) the overloaded antenna comprises a sector antenna of the sectorized cell: and
(c) the power control means comprises means for reducing the power of a sector antenna of the sectorized cell which is adjacent to the overloaded sector antenna.

11. The radio communication system of claim 9 wherein:
(a) the radio communication system comprises a first and a second cell:
(b) the overloaded antenna comprises an antenna in the first cell: and
(c) the power control means comprises means for reducing the power of an antenna of the second cell which is adjacent to the overloaded antenna.

12. The radio communication system of claim 9 wherein the radio communication system comprises a spread-spectrum radio communication system.

* * * * *